Sept. 22, 1953 — H. F. FRUTH — 2,652,740
BIMETALLIC FASTENER
Original Filed Jan. 4, 1946
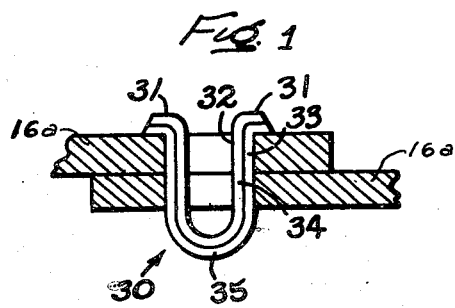
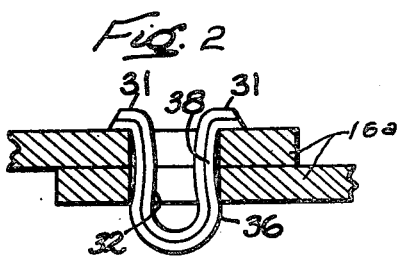
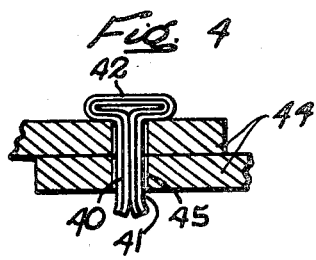
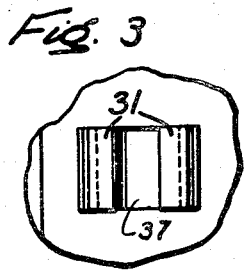
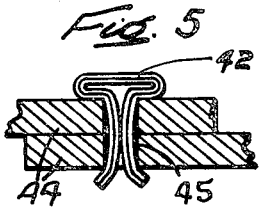
INVENTOR
Hal Frederick Fruth
Carlson Pitzner Hubbard & Wolfe
ATTORNEYS Patented Sept. 22, 1953

2,652,740

UNITED STATES PATENT OFFICE 2,652,740

BIMETALLIC FASTENER

Hal Frederick Fruth, Skokie, Ill.

Original application January 4, 1946, Serial No. 639,046. Divided and this application April 21, 1951, Serial No. 222,211

6 Claims. (Cl. 85—5)

This invention relates to rivet-like fasteners.

Among other objects, the invention aims to provide a novel and easily applied fastener which will function as a so-called blind rivet, that is one which may be applied by manipulation from only one side.

Another object is to provide a fastener of this character which may be applied without the use of presses or other riveting tools.

A further object is to provide a rivet which will automatically expand and upset without the use of the aforesaid tools.

Another object is to provide a fastener which may be easily removed without marring or destroying it, but which will not loosen accidentally despite the ease with which it may be removed.

A still further object is to provide a fastener of such character which will maintain continuous stress on the articles fastened together thereby.

An additional object is to provide a novel joint construction employing a fastener of the above character.

Other objects and advantages will become apparent from the following description and drawing.

In said drawing:

Figure 1 is a sectional view of a fastening device in its initial condition and illustrating its relation to plates to be secured together.

Fig. 2 is a view similar to Fig. 1 but showing the fastener in expanded condition.

Fig. 3 is a top plan view of the fastening device shown in Fig. 1.

Fig. 4 is a sectional view similar to Fig. 1 and showing a different form of double pronged fastening device.

Fig. 5 is a view similar to Fig. 4 but showing the fastening device in expanded or operative condition.

The present case is a divisional application directed to subject matter disclosed in my copending application Serial No. 639,046 filed January 4, 1946, now Patent 2,575,213, issued November 13, 1951.

The illustrative fastener is characterized by bimetallic portions which automatically operate at temperatures to which the fastener is normally subjected in use to provide an expanded ("upset") extremity analogous to that of a rivet for performing the fastening or riveting function. Under abnormal temperatures these bimetallic portions contract to permit the fastener to be inserted into or removed from the rivet hole. No press or other tool commonly used for other rivets, is required for expanding or "upsetting" the end of the fastener. Unlike ordinary rivets the present fastener may be removed simply by application of such abnormal temperatures as will cause contraction. The aforesaid expansion and contraction is effected by employing in the bimetallic portions of the fastener, metals which have substantially different coefficients of thermal expansion and contraction such as brass (which has a relatively high coefficient) and Invar, an alloy of nickel and steel (which has a relatively low coefficient). Flaring or other expansion of the fastener tip occurs when the length at normal operating temperatures of a unit of the inner ply exceeds the length of an initially equal unit of the outer ply. This is true whether such expansion is the result of greater contraction of the outer ply (when the transition to normal temperature involves reduction of temperature) or great expansion of the inner ply when such transition involves an increase of temperature.

The relative arrangement of the two metals therefore depends on the relative temperature to which the fastener is normally subjected in use. For example, if the fastener is to be employed at ordinary atmospheric temperatures, the two metals are coupled so that the fastener will expand at such temperatures. It may be contracted to permit its insertion into the fastener hole (a) by application of heat (such as touching it with a heated solder iron) if the metal having the higher coefficient of expansion be placed outermost, or (b) by application of cold (such as touching it with a piece of Dry Ice or other cold material) if the metal having the higher coefficient of expansion be placed innermost in the couple.

If the fastener is to be employed at temperatures which are normally substantially lower than atmospheric temperatures, the metal having the higher coefficient of expansion and contraction is placed outermost so that when the fastener (after being applied) is cooled to the normal operating temperature, the outermost metal will contract to a greater degree, thereby moving or flexing the bimetallic portions outwardly to expand or upset the fastener end thereby to secure the fastener in place. While such a fastener will normally contract at atmospheric temperatures, such contraction may be aided by application of heat. On the other hand, if the normal temperature to which the fastener is to be subjected is relatively high, that is substantially higher than the surrounding atmosphere, the metal having the higher coefficient of expansion is placed innermost so that the fastener will be contracted on the application of low temperatures to permit its insertion in the fastener holes and will expand to flex the fastener elements outwardly to fasten in place when subjected to the temperatures normally existing in use.

It will be understood that the fastening device is not limited to any specific pair of metals. Other metals than those enumerated having substantially different coefficients of expansion and contraction may be employed.

Two illustrative forms of fasteners are shown in the drawings. The fastener 30 illustrated in Figs. 1 to 3 is designed to secure together two members 16a having alined rectangular holes 37. As shown, the fastener 30 is inserted through the alined holes 37 to have portions protruding from opposite sides of the members. The fastener is generally of U-shape with its extremities flanged or outwardly bent to provide a head 31 and shank 32 comprising plies 33 and 34 of metals having substantially different coefficients of expansion and bonded together by brazing. Other methods of securely bonding or securing the plies together may be employed. The firmness of the bond determines (assuming the fastener otherwise has equal strength) the fastening or riveting force exerted by the fastener.

For use under most conditions the fastener 30 is quickly contracted for insertion into the holes 37 (Fig. 1) by contacting it with a heated solder iron or other heated tool. Thereafter, when the rivet is subjected to the temperatures which normally exist in use it expands and the rounded tip 35 enlarges as at 36 (Fig. 2) to a size larger than the hole 37. This enlargement is accompanied with an inward bowing of the legs or shank 32 as at 38 (Fig. 2).

The fastener 30 may advantageously be made of bimetallic strip stock cut to proper length and bent to the shape above described.

In Figs. 4 and 5 another type of fastener is illustrated. This fastener comprises a pair of bimetallic prongs or fingers 40 and 41 which lie closely adjacent each other at abnormal temperatures. The fastener is advantageously formed from a strip of bimetallic stock doubled on itself into T-shape to provide an integral head 42. A similar result may be obtained by attaching bimetallic fingers to a separately formed head. The bimetallic fingers 40 and 41 are designed to flex outwardly as shown in Fig. 5 when subjected to temperatures normal to the use of the fastener. Such expansion causes the extremities 43 of the fingers to curve outwardly and to grip the material 44 to be fastened. A fastener of this character is designed particularly for use in narrow holes or slots 45. For use at atmospheric temperatures two metals comprising the fingers are arranged with that having the higher coefficient of expansion outermost so as to contract the fingers when heated and separate them on cooling. After the fastener has been inserted and cooled to its operating temperature, the fingers flex outwardly as shown in Fig. 5.

It will be noted in the embodiment of Figs. 4 and 5 that the head portion 42 forms a bracing connection between the opposed portions 40, 41 and enables the latter to exert a mutually outward force.

In appraising the invention from another viewpoint, it will be appreciated that a novel joint connection for two structural members is provided by the invention. The two plates or the like to be joined are somewhat overlapped and provided with two alined holes into which is inserted one of the fasteners just described. Since the final assembly of the joint requires only the insertion of the fastener, which can be conveniently effected from one side of the jointed parts, it is well adapted for use in relatively inaccessible locations. In fact, virtually the only space needed in the final assembly operation is a small clearance permitting entry of a tong or similar implement carrying the fastener into position.

Moreover, the joint thus provided is somewhat resilient in character permitting a slight yielding of the positional relationship of the connected members relative to each other. This limited flexibility of the joint is particularly advantageous in certain installations where undue rigidity between the parts is undesirable. Of additional significance is the fact that this yieldability is obtained without sacrifice of the positiveness of the connection between the joined parts.

I claim as my invention:

1. A joint construction of the class described comprising, in combination, two structural members disposed in overlapping relation to each other and having a pair of alined holes defined therein, and a temperature responsive fastener adapted to extend through said holes to secure said members in assembled relationship, said fastener comprising a substantially rectangular laminated strip folded to present a pair of generally parallel shanks interconnected at one end by an intermediate portion of said strip, the opposite ends of said shanks being flanged outwardly in opposite directions to form an enlarged abutment, said laminated strip including inner and outer bonded layers of materials having unlike temperature coefficients of expansion, said layers being arranged to cause said shanks to move toward each other upon exposure to abnormal temperatures to enable said fastener to be inserted into said holes, said bonded layers further acting upon return to normal temperatures to spread apart said shanks and cause firm engagement of said intermediate portion and said abutment with said overlapping members.

2. A joint construction of the class described comprising, in combination, two structural members disposed in overlapping relation to each other and defining a pair of alined generally rectangular holes therein and a temperature responsive fastener adapted to extend through said holes to secure said members in assembled relationship, said fastener comprising a substantially rectangular laminated strip formed to have a generally U-shape presenting a pair of spaced shanks interconnected at one end by a rounded tip, the opposite ends of said shanks being flanged outwardly in opposite directions to form an enlarged head, said laminated strip including inner and outer bonded layers of materials having unlike temperature coefficients of expansion, said layers being arranged to cause said shanks to move toward each other upon exposure to abnormal temperatures to enable said fastener to be inserted into said holes, said bonded layers further acting upon return to normal temperatures to spread apart said shanks and cause firm engagement of said head and said tip with said overlapping members.

3. A joint construction of the class described comprising, in combination, two structural members disposed in overlapping relation to each other and defining a pair of narrow, alined, generally rectangular holes therein and a temperature responsive fastener adapted to extend through said holes to secure said members in assembled relationship, said fastener comprising a substantially rectangular laminated strip folded upon itself to form an enlarged transverse head and a pair of generally parallel shanks interconnected at one end to said head and extending perpendicularly from the medial portion of one side thereof, the opposite ends of said shanks being flanged outwardly in opposite directions to form an enlarged two-piece abutment, said laminated strip including inner and outer bonded layers of materials having unlike temperature coefficients of expansion, said layers being arranged to cause said shanks to move toward each other upon exposure to abnormal temperatures to enable said fastener to be inserted into said holes, said bonded layers further acting upon return to normal temperatures to spread apart said shanks and cause firm engagement of said head and said abutment with said overlapping members.

4. A temperature responsive fastener adapted to secure two overlapped structural members in assembled relationship, said fastener comprising a substantially rectangular laminated strip formed to have a generally U-shape presenting a pair of generally parallel spaced shanks interconnected at one end by a rounded tip, the opposite ends of said shanks being flanged outwardly in opposite directions to form an enlarged two-piece head, said laminated strip including inner and outer bonded layers of materials having unlike temperature coefficients of expansion, said layers being arranged to cause said shanks to move toward each other upon exposure to abnormal temperatures to enable said fastener to be inserted into preformed holes in the members to be fastened, said bonded layers further acting upon return to normal temperatures to spread apart said shanks and condition said fastener to have firm engagement at opposite ends with said overlapping members.

5. A temperature responsive fastener adapted to secure two overlapped structural members in assembled relationship, said fastener comprising a laminated strip of materials having different coefficients of thermal expansion, said strip being folded to present a pair of generally parallel shanks interconnected at one end by an intermediate portion of said strip, the ends of said shanks remote from said intermediate strip portion being flanged outwardly in opposite directions to form an enlarged two-piece abutment, said layers being arranged to cause said shanks to move toward each other upon exposure to abnormal temperatures to enable said fastener to be inserted into alined holes in the members to be fastened, said bonded layers further acting upon return to normal temperature to spread apart said shanks and condition said fastener to have firm engagement at opposite ends with said overlapping members.

6. A rivet of the character described, comprising in combination, a head and a pair of fingers extending from said head and adapted to be inserted into a rivet hole or the like, said fingers each being formed of two bonded layers of material of different coefficients of thermal expansion, said head and paired fingers being arranged in T formation with said fingers disposed alongside each other in perpendicular relation to said head, the materials in said fingers being in such order that the free ends of said fingers curve outwardly at the temperatures to which the rivet is normally subjected to provide fastening extremities opposite said head, and the intermediate portions of said fingers having abutting engagement with each other at the normal environmental temperature of said rivet to reinforce the outwardly curved finger ends, said fingers straightening and moving together at abnormal temperatures to permit insertion into and removal from the hole.

HAL FREDERICK FRUTH.

References Cited in the file of this patent

UNITED STATES PATENTS

| Number | Name | Date |
|---|---|---|
| 786,692 | Stevenot | Apr. 4, 1905 |
| 1,388,469 | Latham | Aug. 23, 1921 |
| 1,478,028 | Decker | Dec. 18, 1923 |
| 2,362,424 | Walsh | Nov. 7, 1944 |
| 2,386,922 | Andrews | Oct. 16, 1945 |
| 2,575,213 | Fruth | Nov. 13, 1951 |